(12) United States Patent
Choi (10) Patent No.: US 6,404,714 B1
(45) Date of Patent: *Jun. 11, 2002

(54) METHOD AND APPARATUS FOR RECORDING DATA ON AN OPTICAL DISK

(75) Inventor: Young-Do Choi, Kyunggi-do (KR)

(73) Assignee: LG Electronics Inc., Seoul (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/347,397

(22) Filed: Jul. 6, 1999

(30) Foreign Application Priority Data

Sep. 18, 1998 (KR) .............................. 98-39129

(51) Int. Cl.[7] .................................. G11B 5/09
(52) U.S. Cl. .............................. 369/53.12; 369/53.13; 369/53.31; 369/53.36
(58) Field of Search ............................ 369/53.12, 53.13, 369/53.19, 44.32, 53.31, 53.35, 53.36

(56) References Cited

U.S. PATENT DOCUMENTS 6,291,467 B1 * 9/2000 Ishiwata et al. ......... 369/53.29

* cited by examiner

Primary Examiner—Thang V. Tran
(74) Attorney, Agent, or Firm—Birch, Stewart, Kolasch & Birch, LLP (57) ABSTRACT

A method for recording data on an optical disk, capable of detecting an abnormal state which may occur in the middle of data recording, preventing the abnormal state from damaging the optical disk, and recording data continuously from the position wherein the abnormal state happened after the abnormal state terminates. The method of the present invention comprises the steps of (a) examining if an abnormal recording state is encountered while recording data on the optical disk, (b) suspending data recording if an abnormal recording state is detected in step (a), (c) requesting retransmission of the data received in step (a) and receiving said data after said abnormal recording state terminates, and (d) recording said retransmitted data in a selected area on the optical disk.

23 Claims, 5 Drawing Sheets

METHOD AND APPARATUS FOR RECORDING DATA ON AN OPTICAL DISK

BACKGROUND OF THE INVENTION

1. Field of the Invention

The present invention relates to an optical information recording method and apparatus, and more particularly, but not by way of limitation, to a method for recording data on an optical disk, capable of detecting an abnormal state which may occur during data recording, preventing the abnormal state from damaging the optical disk, and recording data continuously after the abnormal state terminates.

2. Description of the Related Art

In an optical information recording/reproducing apparatus, abnormal states caused by external shocks, malfunction of the apparatus, and so forth may occur in the middle of data recording. In an abnormal state, normal data recording cannot be performed since the laser beam spot is likely to deviate beyond an error limit from the center of the track which the laser beam spot has followed.

Such abnormal states encountered during data recording may possibly entail critical problems. In the case of CD-R, the recordable optical disk becomes not usable, and moreover, the data recorded before the abnormal state happens may not be accessible because recording of navigation information concerning the recorded data has not been completed. In the case of a rewritable disk such as CD-RW, the data recorded before the abnormal state occurs should be rewritten, which results in a long recording time.

SUMMARY OF THE INVENTION

It is an object of the present invention to provide a method for recording data on an optical disk. According to the recording method of the present invention, although an abnormal state is encountered in the middle of data recording, the optical disk medium and data recorded thereon are still available and accessible because data recording suspended by the abnormal state is completed after the abnormal state terminates.

A method for recording data on an optical disk in accordance with an embodiment of the present invention comprises the steps of: checking if an abnormal recording state is encountered while recording data on the optical disk; suspending data recording if an abnormal recording state is detected; requesting retransmission of the data received in the above step after the abnormal recording state terminates; and selecting a part of data being retransmitted and recording the selected data on the optical disk.

A method for recording data on an optical disk in accordance with another embodiment of the present invention comprises the steps of: checking if an abnormal recording state is encountered while recording data on the optical disk; suspending data recording if an abnormal recording state is detected and memorizing the position in which the abnormal recording state occurs; storing input data in a memory; continuing to store input data in said memory after the abnormal recording state terminates until said memory becomes full; moving the recording position a distance away from the memorized position and resuming input data recording on the optical disk, said distance amounting to the size of said memory; and recording the data stored in said memory in the area starting from the memorized position after said input data recording finishes.

In the first embodiment of the present invention, if an abnormal recording state is detected during data recording, the data recording operation is suspended until the abnormal recording state terminates. Once the abnormal recording state terminates, the data transmitted before the abnormal recording state occurred are retransmitted. The optical information recording/reproducing apparatus retrieves data recorded on the optical disk from the initial recording position and compares the retrieved data with the retransmitted data to locate the position in which the abnormal recording state occurred. If the position is detected, the data recording operation is resumed from the detected position.

In the second embodiment of the present invention, if an abnormal recording state is detected, the position of the optical pickup is memorized in a memory and the data transmitted after the abnormal state occurred are stored in memory means until the memory means becomes full. If the memory means becomes full, the optical pickup moves to the position a certain distance away from the memorized position and the suspended data recording operation resumes, the distance amounting to the size of the memory means. After the resumed data recording operation finishes, the optical pickup moves to the memorized position and records the data stored in the memory means on the optical disk drive, thereby completing the recording operation without any rewriting of data.

BRIEF DESCRIPTION OF THE DRAWINGS

The accompanying drawings, which are included to provide a further understanding of the invention, illustrate the preferred embodiment of this invention, and together with the description, serve to explain the principles of the present invention.

In the drawings.

DETAILED DESCRIPTION OF THE PREFERRED EMBODIMENTS

In order that the invention may be fully understood, preferred embodiments thereof will now be described with reference to the accompanying drawings.

Figure 1:
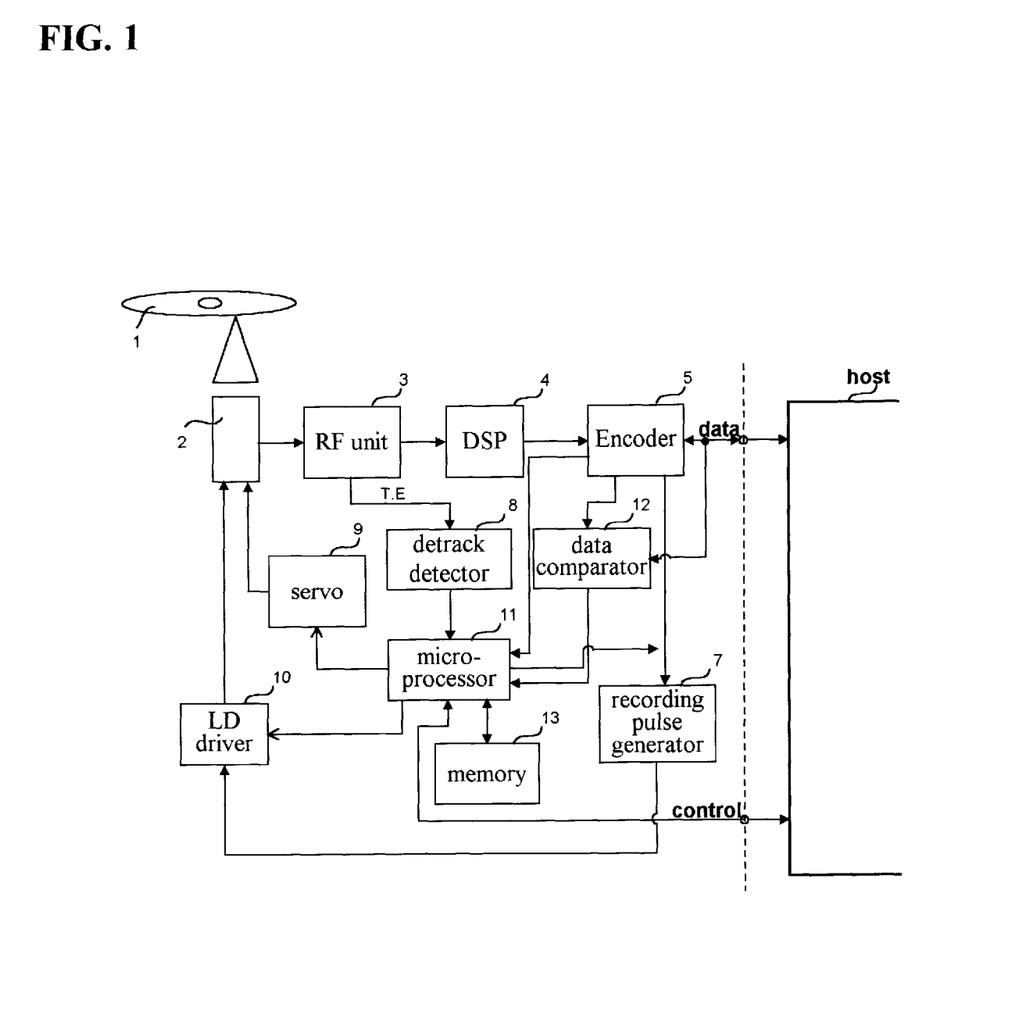
FIG. 1 is a block diagram of an optical information recording/reproducing apparatus in which the invention may be practiced.

FIG. 1 shows a block diagram of an optical information recording/reproducing apparatus in which the present invention may be employed.

The optical information recording/reproducing apparatus comprises an optical pickup 2 for retrieving data recorded on an optical disk 1, an RF unit 3 for creating a tracking error signal by collecting and converting laser beams reflected from optical disk 1 and equalizing and shaping signals reproduced from the reflected laser beams, a digital signal processing unit 4 for retrieving original digital data from the shaped signals outputted from RF unit 3, an encoder 5 for converting the retrieved digital data into data in the format useable by a host computer and vice versa, a comparator 12 for comparing the data outputted from encoder 5 with recording data outputted from the host computer, a recording pulse generator 7 for generating recording pulses corresponding to the data outputted from encoder 5, a detrack detector 8 for detecting detrack states utilizing the tracking error signal (T.E.) created by RF unit 3, a servo unit 9 for controlling optical pickup 2 to perform recording or reproduction of data, an LD driver 10 for driving a laser diode, a memory 13 for temporarily storing data, and a microprocessor 11 for supervising the overall operation of the apparatus.

Figure 2A:
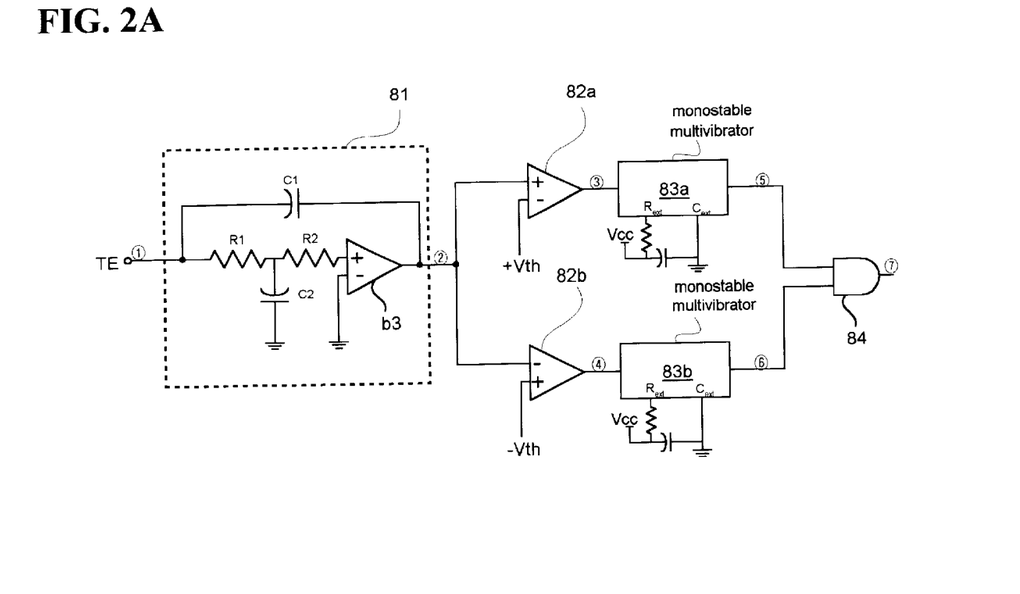
FIG. 2A is a detailed circuit diagram of the detrack detector shown in FIG. 1.

As shown in FIG. 2A, detrack detector 8 further comprises a low-pass filter 81 for only passing low-frequency components of the tracking error signal, interval detectors 82a and 82b for detecting intervals in which the level of the low-pass filtered tracking error signal is higher than a threshold level and lower than a threshold level by comparing the low-pass filtered tracking error signal with the threshold levels, monostable multivibrators 83a and 83b for extending the interval signals outputted from comparators 82a and 82b for a predetermined time duration, and an AND gate 84 for logical AND operation of the extended interval signals.

Figure 3:
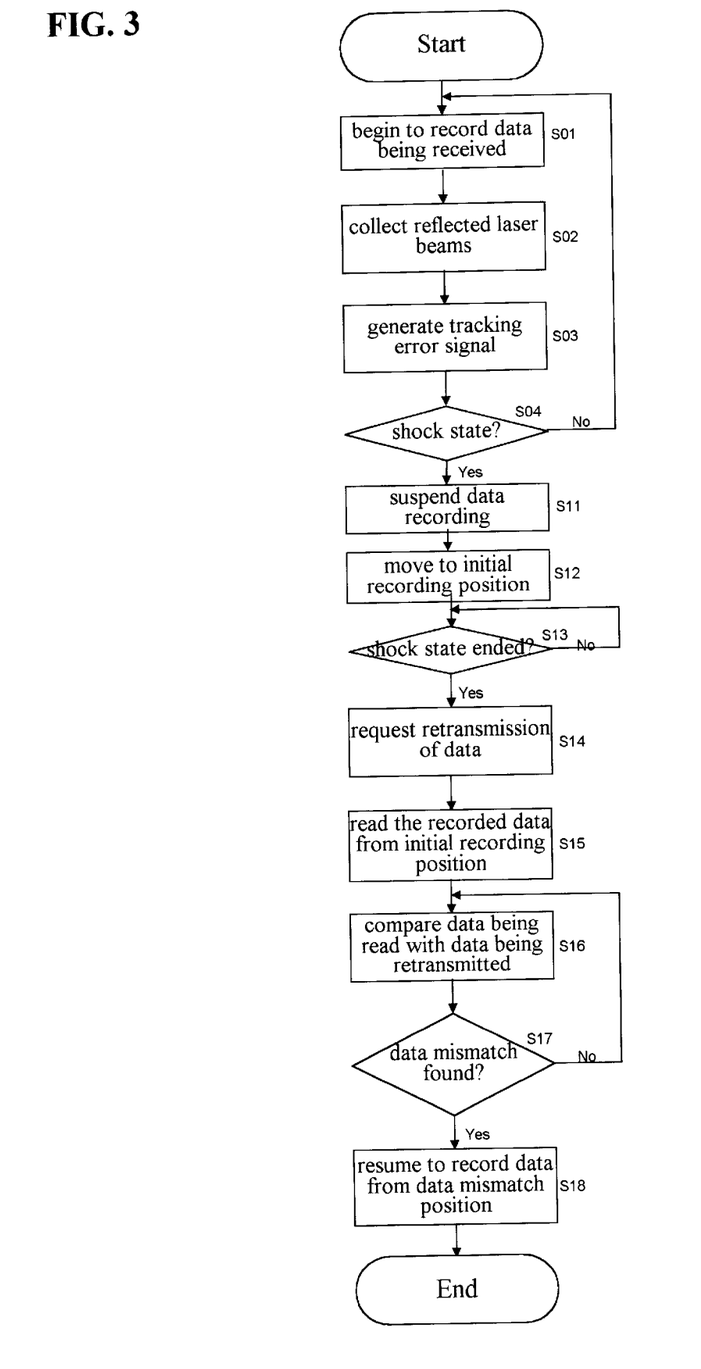
FIG. 3 is a flow diagram of a method according to an embodiment of the present invention.

FIG. 3 is a flow diagram of a method for recording optical information in accordance with an embodiment of the present invention.

If a host computer makes a request for data recording and starts transmitting recording data, encoder 5 converts the input data transmitted by the host computer into a bit stream after reconfiguring the data in a recording format and provides the bit stream to recording pulse generator 7.

Recording pulse generator 7 generates pulse signals corresponding to the bit stream after packing the bit stream into groups. In response to the pulse signals, LD driver 10 provides an electric current to a laser diode in optical pickup 2, thereby allowing the transmitted data to be recorded sequentially on the tracks of optical disk 1 (S01).

During the recording process, laser beams reflected from optical disk 1 are collected and converted into an electric signal by photo diodes in optical pickup 2 (S02). RF unit 3 generates a tracking error signal from the electric signal by the push-pull method (S03), and provides the generated tracking error signal to detrack detector 8. Utilizing the received tracking error signal, detrack detector 8 examines if a detrack state is encountered (S04). The operation of detrack detector 8 is explained below in detail with reference to FIGS. 2A and 2B.

The tracking error signal (① in FIG. 2B) is first provided to low-pass filter 81 in detrack detector 8, wherein high-frequency components of the tracking error signal are attenuated and so a low-pass filtered tracking error signal (② in FIG. 2B) is created. The low-pass filtered tracking error signal is applied to interval detectors 82a and 82b, each of which generates interval signals by comparing the low-pass filtered tracking error signal with its threshold voltage. Interval detector 82a generates a pulse signal while the input signal level exceeds its threshold level, whereas interval detector 82b generates a pulse signal while the input signal level is lower than its threshold voltage.

The duration of the pulse signals (③ and ④ in FIG. 2B) yielded by interval detectors 82a and 82b are extended for a time duration Td (⑤ and ⑥ in FIG. 2B) determined by a pair of a capacitor and a resistor. The extended-duration pulse signal from each interval detector is applied to input of AND gate 84, wherein a level "H" signal (⑦ in FIG. 2B) is generated while both extended-duration pulse signals have the level of "H".

Figure 2B:
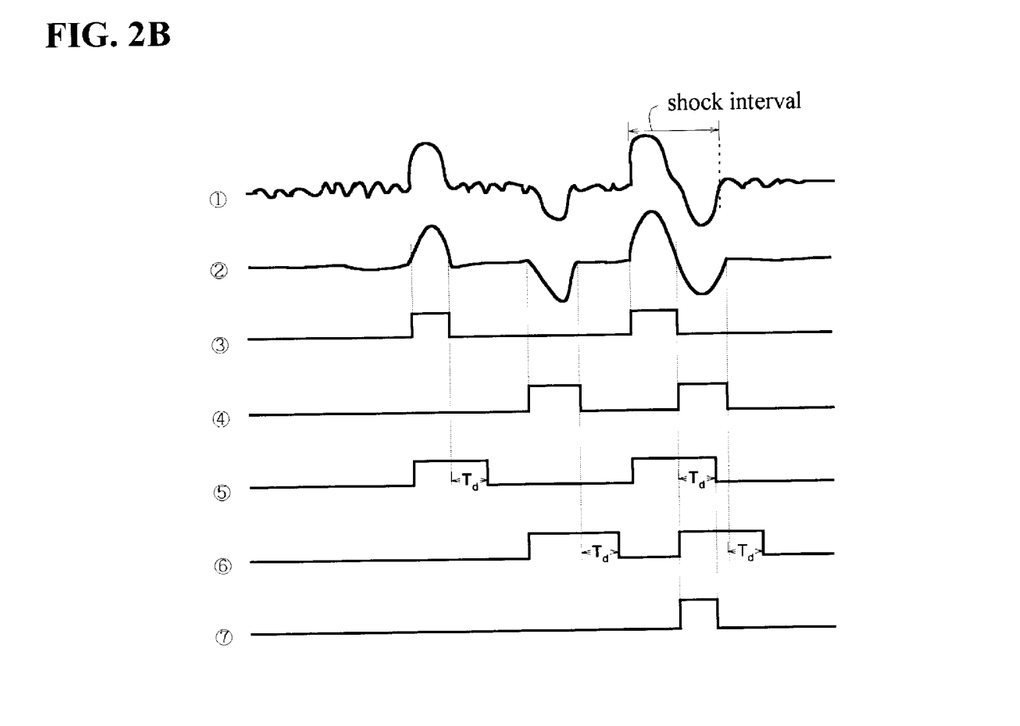
FIG. 2B is a signal diagram showing signals in some important nodes shown in FIG. 2A.

A level "H" signal at the output of AND gate 84 indicates that there is a large fluctuation in the tracking error signal as shown in FIG. 2B. This in turn implies that the laser beam spot deviates by external shocks from the center of the track to be followed by the laser beam spot and therefore normal recording cannot be performed.

If detrack detector 8 detects a detrack state by the aforementioned mechanism, microprocessor 11 controls LD driver 10 to stop emitting laser beams of a writing power (S11) and makes optical pickup 2 return to its initial recording position in which data recording started (S12). Completing these operations, microprocessor 11 keeps examining if the signal at the output of AND gate 8 remains low for a prescribed time duration. If it is confirmed that the detrack state by external shocks has terminated (S13), microprocessor 11 sends a control signal to the host computer requesting retransmission of the recording data transmitted before the detrack state occurred (S14) and starts reproduction of recorded data from the initial recording position (S15).

The recording data retransmitted from the host computer are processed by encoder 5 as were done before and converted to data in the format usable by the recording apparatus. In this case, however, the converted data are not recorded on optical disk 1. Rather, the signals reproduced from optical disk 1 by optical pickup 2 are converted into digital data after being processed by RF unit 3 and digital signal processing unit 4. The retrieved digital data are converted by encoder 5 into data in the format interpretable by the host computer and provided to data comparator 12.

Comparator 12 continues comparing the data outputted from encoder 5 with the data retransmitted from the host computer for each prescribed time duration, for example a time duration between sync signals (S16) and examines if any data mismatch is found (S17).

If a data mismatch is detected in S17, comparator 12 transmits a control signal indicative of the data mismatch to microprocessor 11. In response to the indicating signal, microprocessor 11 controls encoder 5 so that the data retransmitted from the host are reconfigured in a recording format and the reformatted data are provided to recording pulse generator 7. Finally, the data retransmitted from the host computer are recorded on optical disk 1 by LD driver 10 (S18), which completes the data recording process suspended by the detrack state.

Figure 4:
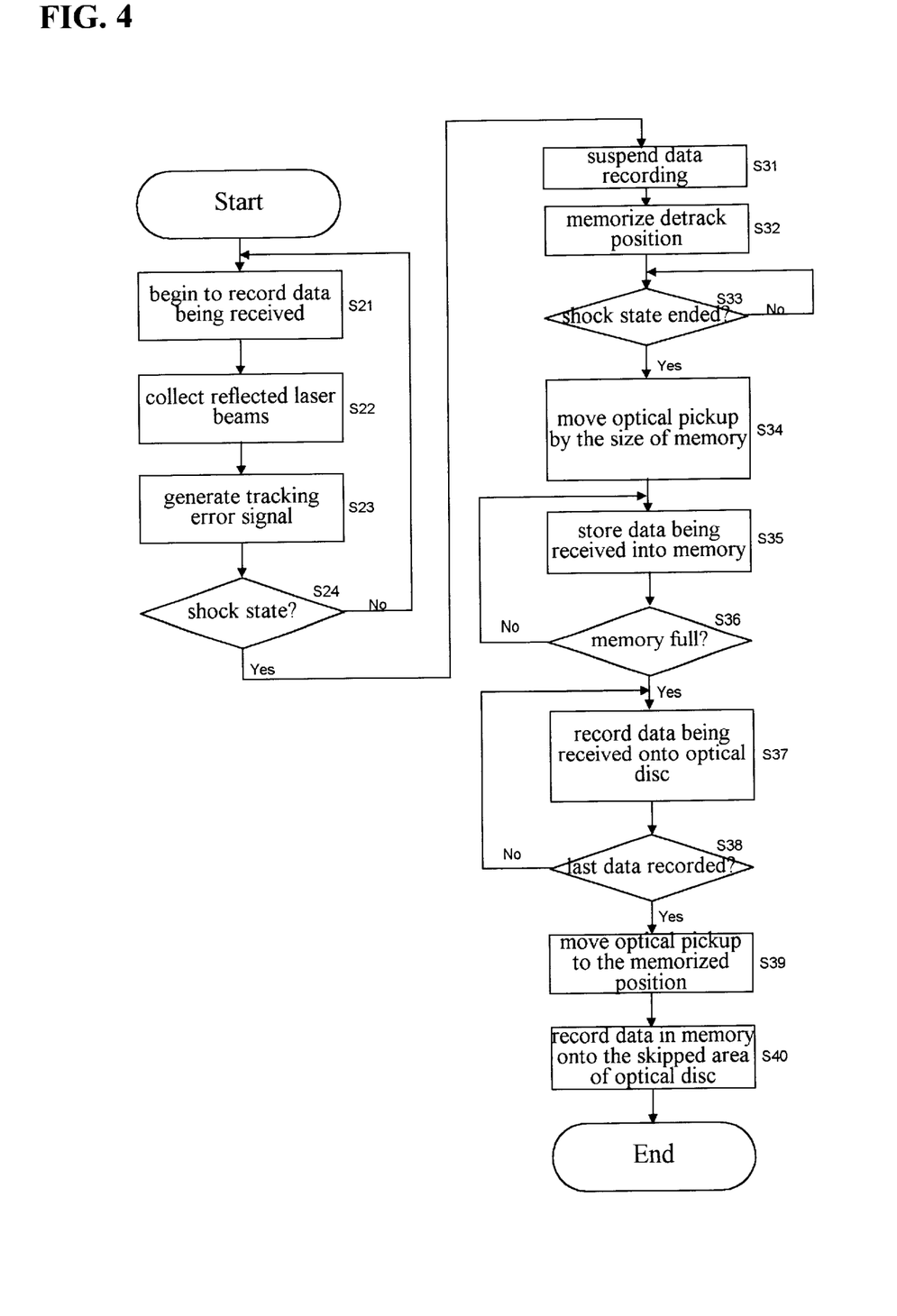
FIG. 4 is a flow diagram of a method according to another embodiment of the present invention.

FIG. 4 is a flow diagram of a method for recording optical information in accordance with another embodiment of the present invention. In this embodiment, the same apparatus shown in FIG. 1 is employed and memory 13 has a designated size to temporarily store recording data transmitted by a host computer after a detrack state is detected.

As in the previous embodiment, detrack detector 8 continues examining if a detrack state occurs (S21~S23). If a detrack state is detected (S24), microprocessor 11 controls LD driver 10 to stop emitting laser beams of a writing power (S31) and temporarily memorizes the current position of optical pickup 2 in an internal memory of microprocessor 11 (S32).

Subsequently, microprocessor 11 temporarily stores the reformatted data transmitted by encoder 5 in memory 13 and keeps examining if the abnormal state comes to an end.

If it is confirmed that the detrack state has terminated (S33), microprocessor 11 controls optical pickup 2 to move to the position a certain distance away from the position temporarily memorized in the internal memory, the distance amounting to the size of memory 13 (S34). One method for this is to move the laser beam spot to the initial recording position first, then to the position memorized in the internal memory, and finally to the target position by jumping tracks corresponding to the size of memory 13. In the case where the optical disk contains address information recorded on its entire area, the laser beam spot can be directly positioned on the target track by calculating the number of tracks to be crossed with reference to the size of memory 13 and the positions where the detrack state began and ended.

After positioning the laser beam on the target track, microprocessor 11 stores recording data transmitted by the host computer in memory 13 until memory 13 becomes full (S35). Once memory 13 becomes full (S36), microprocessor 11 resumes recording of the data transmitted by the host computer after memory 13 becomes full on optical disk 1 through recording pulse generator 7 and LD driver 10 (S37).

When data transmission from the host computer finishes and data recording is completed (S38), microprocessor 11 controls optical pickup 2 to move to the position temporarily memorized in the internal memory (S39). Next, microprocessor 11 begins to read recording-formatted data stored in memory 13 and provides the data to recording pulse generator 7, thereby recording the data temporarily stored in memory 13 in the area on optical disk 1 where the abnormal state occurred (S40).

When the data recording method according to the present invention is applied to a rewritable recording medium like CD-RW, the whole recording data are not retransmitted as done in the embodiment shown in FIG. 3, but only the recording data to be recorded in the area where the recording process has not been completed are retransmitted. In the case, however, some part of the retransmitted data are recorded overlapping with the previously recorded data because it is almost impossible to resume the data recording exactly from the point where the shock happened. Data can be recorded on CD-RW by several methods such as disk at once, session at once, track at once, or packing writing and thus the overlapping interval depends upon which recording method is adopted.

Figure 5A:
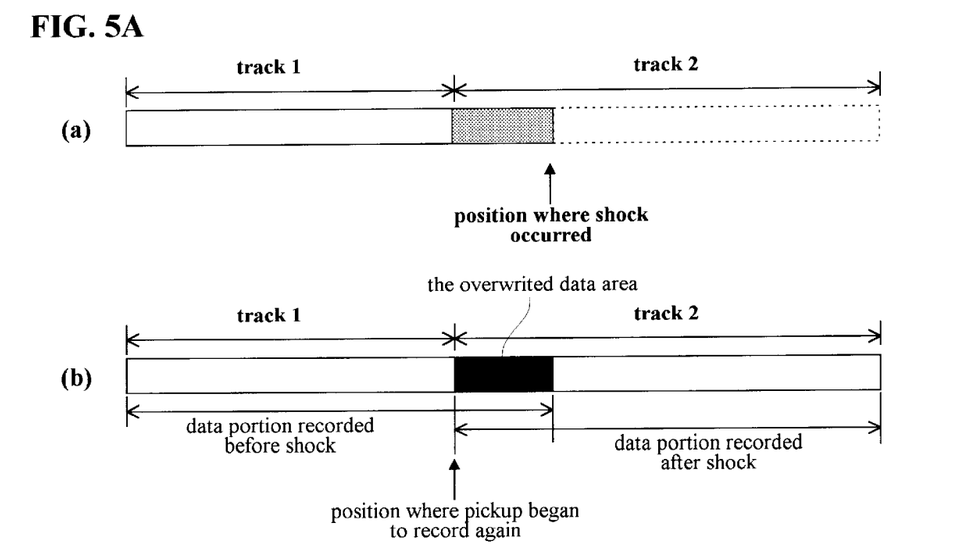
FIGS. 5A and 5B are illustrative examples showing the data recording process when an abnormal state occurs in the middle of data recording.

FIG. 5A illustrates the data recording method according to the present invention when the session at once method is employed, where data recording on track 1 has been completed but data recording on track 2 has not been completed due to a shock occurring in the middle of recording process as shown in (a). If only the data which have not been recorded are intended to be recorded after the shock, a data gap may occur between the data recorded before and after the shock and therefore a critical error may happen when the recorded data are retrieved. To prevent this problem, data corresponding to track 2 is retransmitted and recorded from the start point of track 2 as shown in (b). Consequently, the leading data of track 2 are recorded twice, thereby improving the data recording reliability against shocks.

Figure 5B:
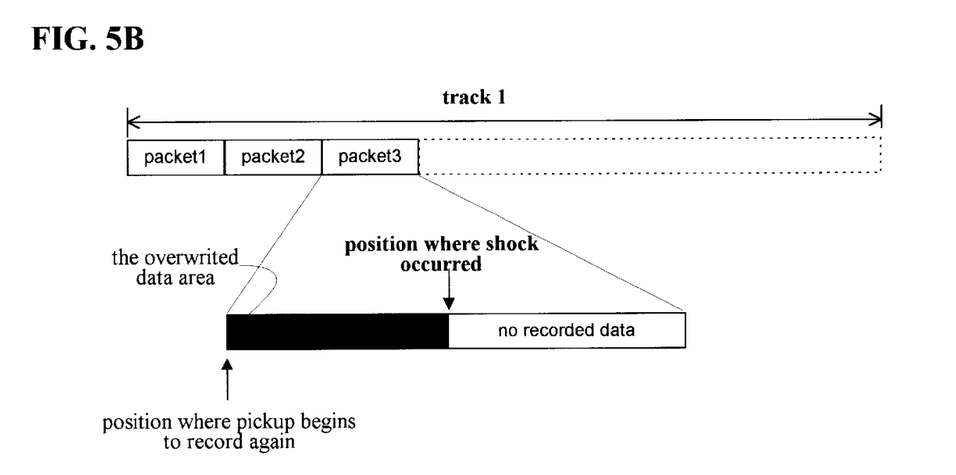

FIG. 5B illustrate the data recording method according to the present invention when the track at once method is employed, where a shock happens while recording data in packet 3. In this case, the recording data corresponding to packet 3 are retransmitted and recorded. The leading data of packet 3 are therefore overwritten and the rest of the recording data are recorded by the normal recording process.

In the method for recording data on an optical disk according to the present invention, although an abnormal recording state occurs by external shocks and the laser beam spot deviates from the center of the track in the middle of data recording, the optical disk medium and data recorded thereon are still available and accessible because data recording suspended by the abnormal state is completed after the abnormal state terminates.

The invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method for recording data on an optical disk, comprising the steps of:
    (a) checking if an abnormal recording state is encountered while recording data on the optical disk;
    (b) suspending data recording if an abnormal recording state is detected in said step (a);
    (c) requesting retransmission of the data received in said step (a), after the abnormal recording state terminates, and positioning an optical pickup to an initial position at which the data recording started; and
    (d) recording continuously the retransmitted data which was not recorded previously on the optical disk starting at a recording position, which is based on the initial position.

2. The method of claim 1, wherein said step (d) comprises the steps of:
    (d1) retrieving the data recorded in said step (a) from the optical disk;
    (d2) comparing the retrieved data with the retransmitted data for each predetermined size; and
    (d3) recording the retransmitted data on the optical disk from the position in which a data mismatch is found in said step (d2).

3. The method of claim 1, wherein said step (b) memorizes a position in which said abnormal recording state occurs, and said step (d) reads out data recorded in said step (a) at a predetermined recording speed on data retransmission and records a part of the retransmitted data on the optical disk from the memorized position.

4. A method for recording data on an optical disk, comprising the steps of:
    (a) checking if an abnormal recording state is encountered while recording data on the optical disk;
    (b) suspending data recording if an abnormal recording state is detected in said step (a) and memorizing the position at which the abnormal recording state occurs;
    (c) storing input data in a memory after the abnormal recording state occurs;
    (d) continuing to store input data in said memory after the abnormal recording state terminates until said memory becomes full;
    (e) moving the recording position a distance away from the memorized position and resuming recording of input data, said distance amounting to the size of said memory; and
    (f) recording the data stored in said memory in the area starting from the memorized position, after the recording of input data in said step (e) finishes.

5. The method of claim 4, wherein said step (e) comprises the steps of:
    (e1) detecting the recording position of an optical pickup when the abnormal recording state terminates;

(e2) adding the memorized position and the number of tracks corresponding to the size of said memory;

(e3) moving the optical pickup by jumping tracks, the number of the tracks amounting to the difference between the detected position and the addition result; and (e4) resuming the input data recording on the optical disk.

6. An apparatus for recording data on an optical disk, comprising:

an encoding unit encoding received data and outputting recording signals corresponding to the encoded data;

a pickup unit writing the recording signals and reading the written signals to/from the optical disk;

a detection unit detecting an abnormal recording state; and a control unit controlling a writing operation in order to record the data continuously in accordance with the abnormal recording state detected by the detection unit, the control unit suspending the writing operation if an abnormal recording state is detected, memorizing a last position of the data recorded before the abnormal recording state occurs, selecting a part of the data to be recorded continuously based on the memorized position after the abnormal recording state terminates, and controlling the writing operation in order to record the selected part of the data on the optical disk, the selected part of the data including a portion of the data which was previously recorded on the disk before the abnormal recording state occurred.

7. The apparatus of claim 6, wherein said control unit controls the writing operation such that the selected part of the data overwrites a predetermined portion of the data previously recorded on the disk.

8. An apparatus for recording data on an optical disk, comprising:

an encoding unit encoding received data and outputting recording signals corresponding to the encoded data;

a pickup unit writing the recording signals and reading the written signals to/from the optical disk;

a detection unit detecting an abnormal recording state; and a control unit controlling a writing operation in order to record the data continuously in accordance with the abnormal recording state detected by the detection unit, the control unit suspending the writing operation if an abnormal recording state is detected, memorizing a last position of the data recorded before said abnormal recording state occurs, requesting retransmission of recording data after the abnormal recording state terminates, selecting a part of the retransmitted data based on the memorized position, and controlling the writing operation in order to record the selected part of the retransmitted data on the optical disk.

9. The apparatus of claim 8, wherein said control unit causes only a part of the retransmitted data which was not previously recorded to be recorded on the optical disk.

10. The apparatus of claim 9, wherein said control unit requests retransmission of one or more recording data units which were not previously recorded.

11. The apparatus of claim 10, wherein said control unit requests retransmission of a single recording data unit, which is one session of data.

12. The apparatus of claim 10, wherein said control unit requests retransmission of a single recording data unit, which is one track of data.

13. The apparatus of claim 10, wherein said control unit requests retransmission of a single recording data unit, which is one packet of data.

14. A method for recording data on an optical disk, comprising the steps of:

(a) checking if an abnormal recording state is encountered while recording data on the optical disk;

(b) suspending data recording if an abnormal recording state is detected in said step (a);

(c) memorizing the position at which said abnormal recording state occurs;

(d) requesting retransmission of the data received in said step (a), after the abnormal recording state terminates, and positioning an optical pickup to an initial position at which the data recording started;

(e) retrieving the data recorded in said step (a) at a predetermined reproducing speed from the position in which the data recording started, and comparing the retrieved data with the retransmitted data; and (f) actually recording the remaining data on the optical disk when data corresponding to the position stored in the step (c) is detected based on the comparing result.

15. A method for recording data on an optical disk, comprising the steps of:

(a) checking if an abnormal recording state is encountered while recording data on the optical disk;

(b) suspending data recording if an abnormal recording state is detected in said step (a);

(c) requesting retransmission of a data unit which includes a part of the previously recorded data, after the abnormal recording state terminates, the data unit to be recorded in the area where the recording has not been completed; and (d) continuously recording the retransmitted data on the optical disk after the abnormal recording state terminates.

16. The method of claim 15, wherein the data unit to be retransmitted depends on the writing mode.

17. The method of claim 15, wherein some portion of the retransmitted data are recorded overlapping with the previously recorded data.

18. The method of claim 17, wherein the portion which is overlapping depends in the writing mode.

19. The method of claim 15, wherein the data unit corresponds to a packet in a recording data format.

20. The method of claim 15, wherein the data unit corresponds to a track in a recording data format.

21. A method for recording data on an optical disk, comprising the steps of:

(a) checking if an abnormal recording state is encountered while recording data on the optical disk;

(b) suspending data recording if an abnormal recording state is detected in said step (a); and (c) continuously recording the data on the optical disk after the abnormal recording state terminates, wherein said step (c) includes the step of overwriting at least a portion of the data recorded before the abnormal recording state occurred.

22. The method of claim 21, wherein a period of the portion which is overwritten depends on the writing mode.

23. A method for recording data on an optical disk, comprising the steps of:

(a) checking if an abnormal recording state is encountered while recording data on the optical disk;

(b) suspending data recording if an abnormal recording state is detected in said step (a);

(c) requesting retransmission of a part of the data received in said step (a), after the abnormal recording state terminates; and
(d) selecting a part of the retransmitted data and recording the selected part on the optical disk, the selected part including a portion of data which was previously recorded on the optical disk before said abnormal recording state occurred.

* * * * *